(12) United States Patent
Shreiner et al.

(10) Patent No.: US 8,803,898 B2
(45) Date of Patent: Aug. 12, 2014

(54) FORMING A WINDOWING DISPLAY IN A FRAME BUFFER

(75) Inventors: David Robert Shreiner, Mountain View, CA (US); Ian Victor Devereux, Cambridge (GB); Edvard Sørgård, Hundhamaren (NO); Thomas Jeremy Olson, San Jose, CA (US)

(73) Assignee: ARM Limited, Cambridge (GB)

( * ) Notice: Subject to any disclaimer, the term of this patent is extended or adjusted under 35 U.S.C. 154(b) by 1244 days.

(21) Appl. No.: 12/654,385

(22) Filed: Dec. 17, 2009

(65) Prior Publication Data

US 2011/0148892 A1   Jun. 23, 2011

(51) Int. Cl.
| | |
|---|---|
| G06F 13/00 | (2006.01) |
| G09G 5/36 | (2006.01) |
| G06T 1/00 | (2006.01) |
| G06F 3/048 | (2013.01) |

(52) U.S. Cl.
USPC ........... 345/537; 345/536; 345/545; 345/522; 715/764; 715/778; 715/781; 711/100; 711/154; 711/155; 711/170

(58) Field of Classification Search
USPC ......................... 345/545–551, 536–538, 522; 715/764–768, 778, 781–807; 711/100, 711/154, 155, 170–173
See application file for complete search history.

(56) References Cited

U.S. PATENT DOCUMENTS

| 6,888,551 | B2* | 5/2005 | Willis et al. ................... 345/568 |
| 7,847,755 | B1* | 12/2010 | Hardebeck et al. ............ 345/2.2 |
| 2002/0171657 | A1* | 11/2002 | Lavelle et al. ................ 345/557 |
| 2007/0038939 | A1* | 2/2007 | Challen et al. ................ 715/734 |
| 2007/0132771 | A1* | 6/2007 | Peer et al. ..................... 345/545 |
| 2009/0091569 | A1* | 4/2009 | Nordlund et al. ............. 345/422 |
| 2009/0262122 | A1* | 10/2009 | Darsa et al. ................... 345/545 |
| 2011/0134120 | A1* | 6/2011 | Antonyuk et al. ............ 345/426 |

FOREIGN PATENT DOCUMENTS

| EP | 0 436 959 | 7/1991 |
| JP | 7-110787 | 4/1995 |
| JP | 2006-209651 | 8/2006 |
| JP | 2007-219626 | 8/2007 |

OTHER PUBLICATIONS

UK Search Report dated Feb. 22, 2011 for GB 1017784.8.

* cited by examiner

*Primary Examiner* — Wesner Sajous
*Assistant Examiner* — Andrew Shin
(74) *Attorney, Agent, or Firm* — Nixon & Vanderhye P.C.

(57) ABSTRACT

A windowing display using deferred drawing commands operates by processing the drawing commands that write to a tile 22 of a frame buffer 30 to form one or more new pixel values are stored within a tile memory 40. Dirty pixel data indicative of which pixels within the tile memory are dirty pixels storing new pixel values and which pixels within the tile memory are clean pixels not storing new pixel values is also formed. In dependence upon the dirty pixel data, the new pixel value stored within the tile memory are written to the frame buffer memory. Pixels stored within the frame buffer memory corresponding to clean pixels within the tile memory remain unaltered as they are not written.

13 Claims, 8 Drawing Sheets

FORMING A WINDOWING DISPLAY IN A FRAME BUFFER

BACKGROUND OF THE INVENTION

1. Field of the Invention

This invention relates to the field of data processing systems. More particularly, this invention relates to the forming of a windowing display in a frame buffer memory within a data processing system.

2. Description of the Prior Art

It is known that some data processing systems use a windowing display. Windowing displays are utilised by systems such as those running the Windows XP operating system produced by Microsoft Corporation and the X Windows system component of operating systems such as Linux. Within such systems, drawing commands are generated by application programs or programs responsible for maintaining the background of the display so as to form within a frame buffer memory pixel values which will when driven to a display result in the desired windowing display being generated. Such windowing displays typically include multiple potentially overlapping windows upon a background. The display order of the windows may be altered and the windows may be changed in size and position under control of user inputs. When such changes are made, it is normal for the window manager program to issue windowing control commands to the application program(s) or background drawing program such that these in turn then issue drawing commands to the graphics system in order that the required writes of new pixel values are made into a frame buffer memory for the windowing display.

FIGS. 1 and 2 of the accompanying drawings illustrate such systems. FIG. 1 illustrates a windowing display with a background image 2 upon which are formed a first window 4 and a second window 6. The second window 6 is higher in the display order than the first window 4 and accordingly when the second window 6 overlies a portion of the first window 4, then that portion of the first window 4 is obscured. User inputs, such as with a computer mouse, may move the second window 6 to a different position within the windowing display as illustrated and this results in the portion of the first window 4 previously overlaid by the second window 6 becoming uncovered whereas other different portions of the first window 4 previously being displayed could now be obscured by the second window 6.

FIG. 2 schematically illustrates a window manager 8 responsive to user inputs to generate windowing control commands which are respectively passed to a first application program 12 which is responsible for the second window 6, a second application program 14 which is responsible for the first window 4 and a background drawing program 16 which is responsible for drawing the background image 2. The windowing control commands may, for example, specify areas of the screen which the window manager 8 instructs one of the first application program 12, the second application program 14 or the background drawing program 16 to draw using their relevant graphical content. The first application program 12, the second application program 14 and the background drawing program 16 then generate drawing commands which are passed to a graphics system. These drawing commands result in the necessary pixel values being generated by the graphics system at the relevant portions within the frame memory. Thus, if the second window 6 is moved such that the first window 4 is now fully visible, then the upper right hand corner of the first window 4 will require drawing by the second application program 14. The windowing control command generated by the window manager 8 issues a windowing control command instructing that the second application program 14 now generates pixel data for the upper right hand corner of the first window 4. The second application program 14 is responsive to this windowing control command to issue drawing commands to the graphics system to generate pixel values for the now uncovered upper right hand corner of its window 4.

The systems and mechanisms illustrated and discussed in relation to FIGS. 1 and 2 are based upon the assumption that when a drawing command is issued to the graphics system, this is substantially immediately acted upon and written to the frame buffer memory storing the pixel values for the current image being displayed. The graphics system is assumed to have access to the frame buffer memory without delay and be able to both read and write pixel values in response to the drawing commands as they are received by the graphics system. Such an arrangement as typically employed by the displays utilises a single-buffered frame buffer memory and immediate mode graphics rendering.

Another form of graphics system which is becoming common utilises tile-based graphics rendering. Such systems are well suited to low cost and low power implementations as they generally are more efficient in the way that memory is accessed. In particular, tile-based systems normally use deferred rendering and operate in a double-buffered mode. In such systems drawing commands are received and analysed to identify which tiles within the overall frame contain pixel values which will be altered by those drawing commands. The frame is divided into a plurality of tiles for this purpose. Thus, the drawing commands are "binned" into tile lists of drawing commands with each tile list containing all those drawing commands for a new frame of image data to be formed that change a pixel value within the tile concerned. When all the drawing commands for a new frame have been generated and binned into the plurality of tile lists, then the tile lists are separately processed to generate the pixel values for those tiles which are stored within a tile memory. When processing of the tile is complete, the contents of the tile memory are written out to the frame buffer memory. When all of the tiles have been processed and the contents of the relevant tile memory written out to the frame buffer, then the new frame data is complete and may be displayed by switching the active frame buffer in the double-buffered arrangement. Such double-buffered tile-based rendering systems are ill suited to supporting windowing displays.

More particularly, in a windowing display when user inputs require modification of the pixel values being displayed then within a tile-based system it would normally be required to first read the contents of each tile from the current frame of pixel values, modify each tile of pixel values and then write each tile of pixel values back into the frame buffer. This reading and writing of all of the pixel values of each tile requires a disadvantageously high number of memory accesses which both reduces speed and increases energy consumption.

SUMMARY OF THE INVENTION

Viewed from one aspect the present invention provides a method of forming a windowing display, said method comprising the steps of:

processing one or more drawing commands that write to a tile of a frame buffer memory to form one or more new pixel values to be written to said tile;

storing said one or more new pixel values within a tile memory;

forming dirty pixel data indicative of which pixels within said tile memory are dirty pixels storing said one or more new pixel values and which pixels within said tile memory are clean pixels not storing said one or more new pixel values; and in dependence upon said dirty pixel data, writing said one or more new pixel values stored within said dirty pixels of said tile memory to corresponding locations of said frame buffer memory, with pixel values stored within said frame buffer memory corresponding to clean pixels within said tile memory being preserved unaltered.

The present technique recognises that within a windowing display in a frame buffer memory, if when processing drawing commands that write to a tile within the frame buffer memory the system also generates dirty pixel data indicating which pixels within the tile have been altered and are storing new pixel values, then this dirty pixel data may be used to control writing of the new pixel values into the frame buffer memory without having to first read the existing tile of pixel values out of the frame buffer memory. The dirty pixel data directs the writes to the required pixel positions within the frame buffer memory with the existing pixel data within the frame buffer memory corresponding to the clean pixels within the tile being preserved unaltered since no writes are made to these clean pixel positions. In this way, the support of windowing displays is made faster and more efficient. The system still uses a tile memory into which the new pixel values are written before being written to the frame buffer memory and yet the action of the dirty pixel data serves to direct the writes from the tile memory such that only the new pixel values are written to the frame buffer memory and accordingly the unaltered pixel values within the frame buffer memory are preserved in the appropriate manner.

It will be appreciated that the tile within such systems can have a variety of different sizes. At one extreme a tile may be the same size as the frame buffer and the tile memory capable of storing a full set of data for the frame buffer memory. At another extreme the tile may be a single pixel in size. However, typically a tile is one of a plurality of tiles that together correspond to the windowing display in the frame buffer memory. Typical values of the tile sizes might be 16-by-16 pixels, although it will be appreciated that different tile sizes may be chosen and the present technique is applicable to all of these tile sizes.

The steps of processing, storing, forming and writing may be separately performed on each one of the plurality of tiles to form the full frame of the windowing display in the frame buffer memory. The tile-based nature of the processing is well suited to acceleration through the use of parallel hardware for performing the steps of processing, storing, forming and writing.

The drawing commands which are generated may be stored without being immediately acted upon within a command store which holds one or more deferred drawing commands. The deferred drawing commands within this command store may then be read in respect of each one of the plurality of tiles so as to extract the one or more deferred drawing commands that write to a tile currently being processed.

The storing of the one or more drawing commands may comprise binning of the drawing commands by identifying which of the drawing commands write to which of the plurality of tiles and forming separate bin stores for each of the plurality of tiles into which deferred commands that write to that tile are stored. By effectively sorting the drawing commands in this way as they are being deferred, the bin stores for each tile are formed and then when the trigger to draw the tiles is encountered the deferred drawing commands for each tile may be directly read from the corresponding bin store for that tile and rendered (possibly with highly parallel hardware).

It will be appreciated that the dirty data may take a wide variety of different forms and may in a general sense be any data structure that serves to identify which pixels within a tile have been altered and which pixels within a tile have not been altered. However, a hardware efficient way of storing and manipulating the dirty data is to use a bit field with each bit corresponding to a pixel within the tile and having a bit value indicating one of the pixel being a dirty pixel and the pixel being a clean pixel. In this sense, dirty and clean are used in a similar way as these terms are used within the field of cache memories to indicate values which have been changed (dirty) and values which have not been changed (clean).

The dirty pixel data may conveniently form a write mask used to control which pixel values are copied from the tile memory to the frame buffer. Such a write mask is well suited for controlling dedicated hardware for generating the required writes which copy the new pixel values from the tile memory to the frame buffer memory.

The present techniques may be conveniently used in a system in which a window manager generates windowing control commands which are issued to one or more application programs (with corresponding windows) and a background drawing program for drawing any background areas of the display. The application programs and the background drawing program can then respond to the windowing control commands to generate the drawing commands which are processed on a tile-by-tile basis as discussed above.

The steps of processing, storing, forming and writing may be performed by tile-based graphics processing unit. Such dedicated hardware is well suited to exploiting the present techniques. However, it will be appreciated that the present techniques could be performed by a general purpose processor operating under appropriate software control. Furthermore, a combination of dedicated graphics processing hardware and a general purpose processor operating under software control may be used with the division of which tasks are performed by which part of such embodiments being varied as required depending upon the priorities of the system concerned, e.g. power/efficiency versus flexibility.

While the present techniques are useful in systems that use a compositing scheme, they are well suited to systems in which the windowing display is a non-composited windowing display. Non-composited windowing displays typically require the hardware to have mechanisms for dealing with the necessary drawing as a user moves windows and alters the windowing display.

Viewed from another aspect the present invention provides an apparatus for forming a windowing display, said apparatus comprising:

processing circuitry responsive to one or more drawing commands that write to a tile of a frame buffer memory to form one or more new pixel values to be written to said tile;

a tile memory configured to store said one or more new pixel values;

dirty pixel data forming circuitry configured to form dirty pixel data indicative of which pixels within said tile memory are dirty pixels storing said one or more new pixel values and which pixels within said tile memory are clean pixels not storing said one or more new pixel values; and write generating circuitry responsive to said dirty pixel data to write said one or more new pixel values stored within said dirty pixels of said tile memory to corresponding locations of said frame buffer memory, with pixel values stored within said frame buffer memory corresponding to clean pixels within said tile memory being preserved unaltered.

Viewed from a further aspect the present invention provides an apparatus for forming a windowing display, said apparatus comprising:

processing means responsive to one or more drawing commands that write to a tile of a frame buffer memory for forming one or more new pixel values to be written to said tile;

tile memory means for storing said one or more new pixel values;

dirty pixel data forming means for forming dirty pixel data indicative of which pixels within said tile memory are dirty pixels storing said one or more new pixel values and which pixels within said tile memory are clean pixels not storing said one or more new pixel values; and write generating means responsive to said dirty pixel data for writing said one or more new pixel values stored within said dirty pixels of said tile memory to corresponding locations of said frame buffer memory, with pixel values stored within said frame buffer memory corresponding to clean pixels within said tile memory being preserved unaltered.

Viewed from a further aspect the present invention provides a computer program storage medium storing a computer program for controlling an apparatus for processing data to form a windowing display by performing a method comprising the steps of:

processing one or more drawing commands that write to a tile of a frame buffer memory to form one or more new pixel values to be written to said tile;

storing said one or more new pixel values within a tile memory;

forming dirty pixel data indicative of which pixels within said tile memory are dirty pixels storing said one or more new pixel values and which pixels within said tile memory are clean pixels not storing said one or more new pixel values; and in dependence upon said dirty pixel data, writing said one or more new pixel values stored within said dirty pixels of said tile memory to corresponding locations of said frame buffer memory, with pixel values stored within said frame buffer memory corresponding to clean pixels within said tile memory being preserved unaltered.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
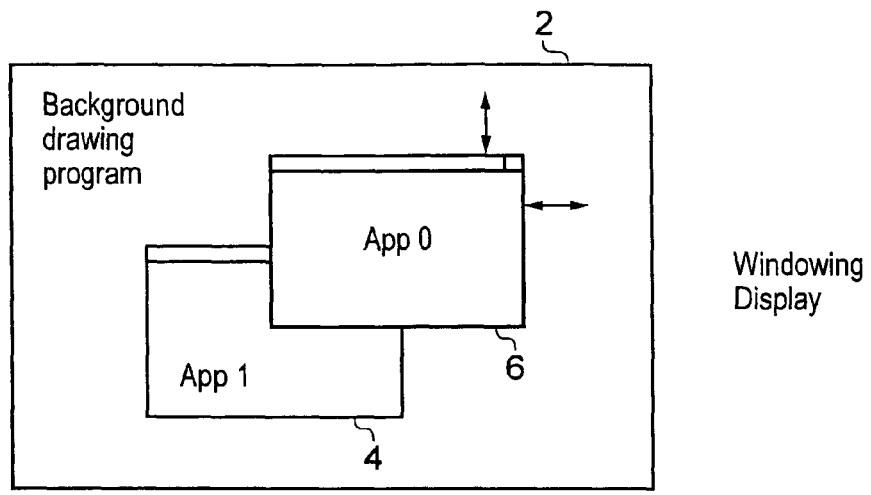
FIG. 1 schematically illustrates a windowing display.
Figure 2:
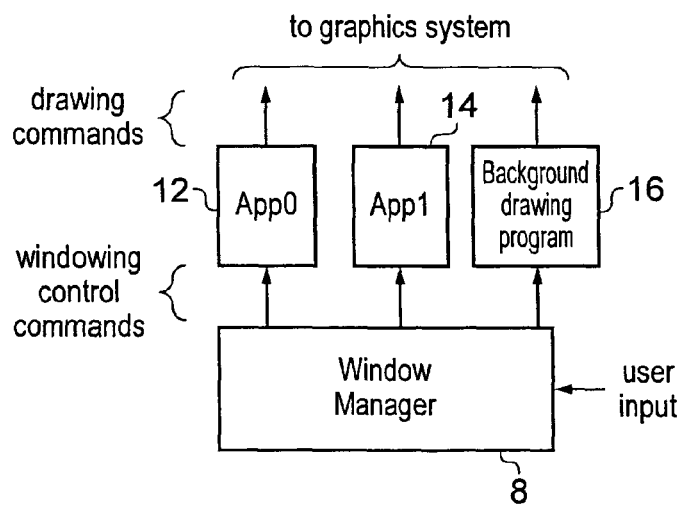
FIG. 2 schematically illustrates the relationship between a window manager program for generating windowing control commands and application programs and a background drawing program for generating drawing commands to a graphics system.
Figure 3:
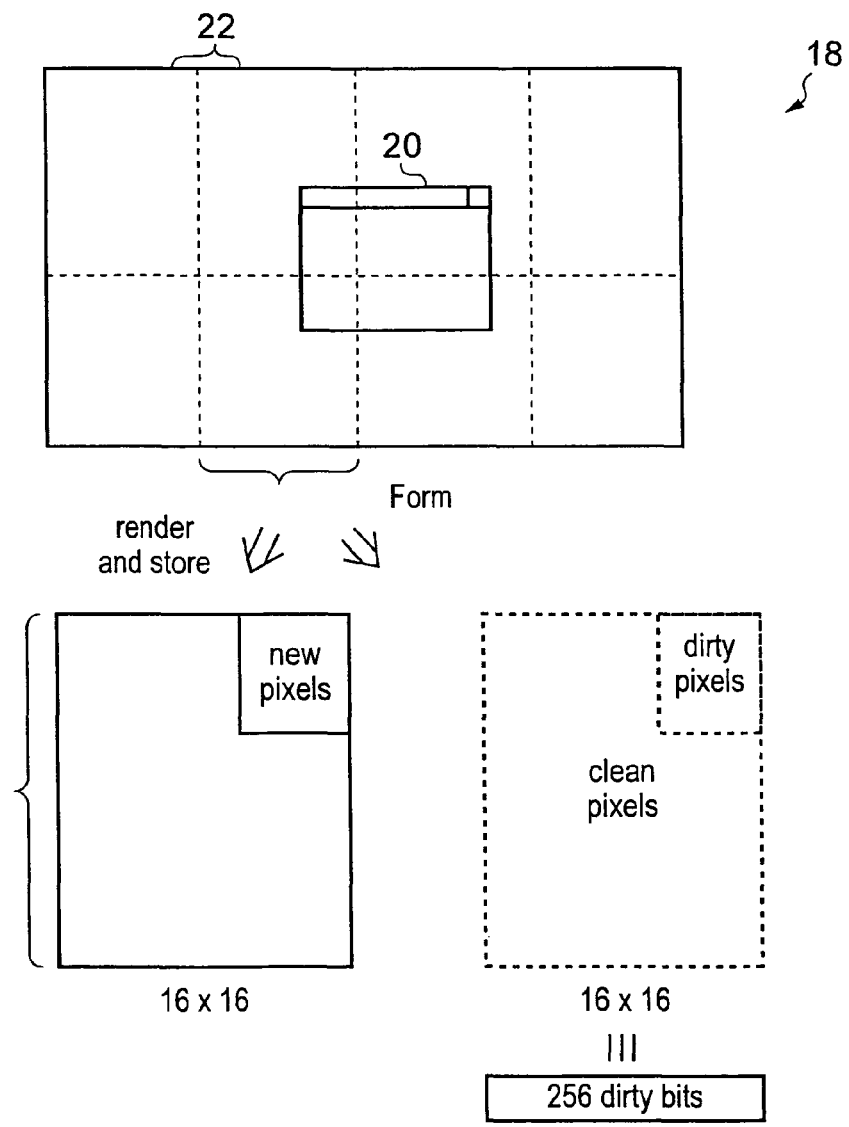
FIG. 3 illustrates how a frame within a windowing display may be split into tiles for rendering with the associated formation of dirty pixel data.

FIG. 3 schematically illustrates a frame 18 of a windowing display including a window 20 drawn by an application program and a background region forming the remainder of the frame. The frame is split into eight tiles 22. It will be appreciated that in practice a frame may be split into a larger number of tiles. Furthermore, the present technique may also be used when the frame comprises a single tile or when each tile comprises only one pixel.

The lower portion of FIG. 3 illustrates how one of the tiles is processed. This tile is shown as having a dimension of 16*16 pixels, although this is only one example of a possible tile size. The drawing commands which generate new pixel values for that tile are identified by a process of binning as will be described later. When these drawing commands have been identified, they are processed in respect of the currently selected tile and the new pixel values generated are written to a tile memory within the graphics processing unit. The tile is thus subject to a rendering operation which processes its drawing commands and a storage operation which stores the new pixel values concerned into the tile memory. At the same time, as each new pixel value is written into the tile memory, a corresponding bit within dirty pixel data is set to indicate that the pixel location concerned contains a new pixel value. The dirty pixel data is initialised with bit values indicating all clean pixels that are not altered. Thus, after all the drawing commands for the tile concerned have been processed, the dirty pixel data will contain bit values set to indicate dirty pixels at all of those locations where a new pixel value has been written. As illustrated in FIG. 3, new pixel values corresponding to the lower left hand corner of the window 20 within the frame are written into pixel locations in the upper right hand corner of the tile and the corresponding positions within the dirty pixel data are written to indicate that those pixel positions are dirty.

The dirty pixel data is illustrated in a two-dimensional form in FIG. 3 as well as being illustrated as a 256 dirty bit field. It will be appreciated that there is a one-to-one mapping between the pixels within the two-dimensional form and the 256-bit field and these representations of the dirty pixel data are equivalent.

Figure 4:
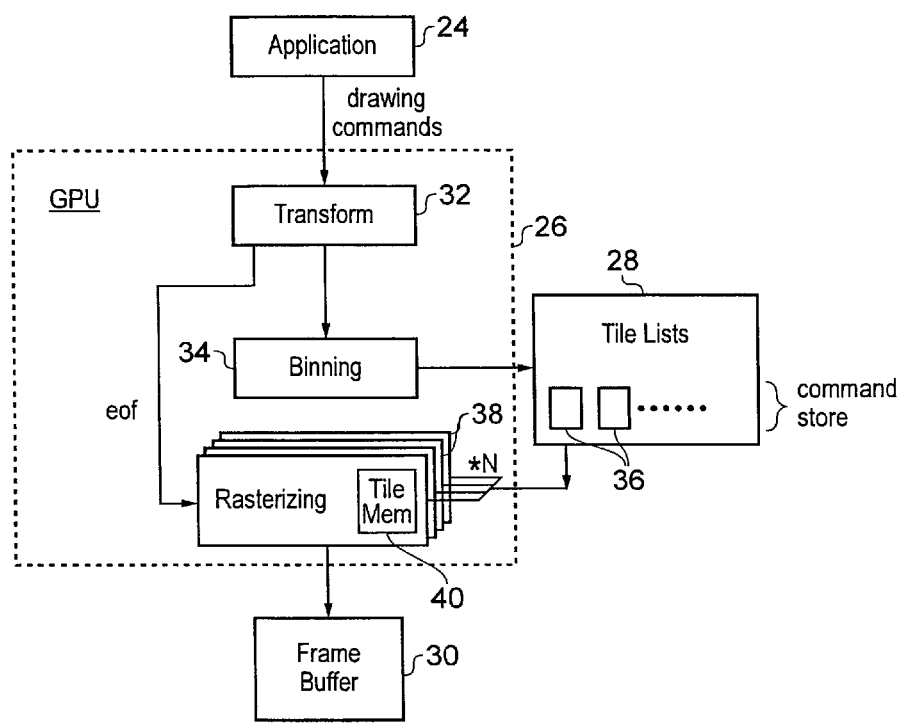
FIG. 4 schematically illustrates a graphics processing unit for performing generation of a windowing display using tile-based rendering.

FIG. 4 schematically illustrates the relationship between an application program 24 generating drawing commands, a graphics processing unit 26 for processing those drawing commands using tile-based rendering, a tile list 28 storing binned drawing commands in respect of different tiles within a memory and a frame buffer memory 30 into which the new pixel values representing the windowing display are written (in different architectures the frame buffer (30) may also be in the GPU, or in the system memory). It will be appreciated that the dotted line surrounding the graphics processing unit 26 illustrated in FIG. 4 delineates the elements within the graphics processing unit 26. In practice, in other embodiments, some or all of these elements may be provided by other hardware components or in software. It would, for example, be possible to perform all of the tasks of the graphics processing unit 26 using a suitably programmed general purpose computer and such embodiments would have some advantages in terms of the flexibility and the visibility of the processing performed. However, the content of the graphics processing unit 26 illustrated in FIG. 4 is one well suited to fast and low power tile-based graphics rendering.

The graphics processing unit 26 of FIG. 4 contains a transform unit 32 for performing transform operations upon the received drawing commands, such as translation, scaling, rotation etc. A binning unit 34 receives the transformed drawing commands and subjects them to binning in which it is identified which of the drawing commands write to which of the plurality of tiles 22, e.g. if a point, line or triangle is to be drawn, then the identification determines whether or not this at least partially intersects a given tile 22. If at least part of the new pixels generated by that drawing command fall within a given tile, then the drawing command is "binned" to that tile and stored within a corresponding associated bin store 36. Each bin store 36 corresponds to a tile 22 and contains the drawing commands which when rasterized will cause new pixel values to be written within that tile. It will be appreciated that this binning may not be precise and may take a cautious approach in which if it cannot be absolutely determined which new pixel values will be set, but there is any chance that some of these will lie within a tile, then the drawing command may be binned to that tile. When the drawing command is actually rasterized (processed/rendered) then an absolute determination of the new pixel values and their locations will be made. If none of these happen to lie within the tile concerned, then some processing effort will have been wasted, but the final result produced will be correct.

The bin stores 36 collectively form a command store storing the drawing commands to be processed by rasterizing units 38. The bin stores 36 may be stored in general purpose memory if desired.

The rasterizing units 38 are triggered to start processing the drawing commands from the bin stores 36 when they receive an end of frame (EOF) signal from the transform unit 32 indicating that all of the drawing commands to generate a new frame of the windowing display have been received and placed into the appropriate bin stores 36. In practice the graphics processing unit 26 will receive drawing commands from several different application programs and a background drawing program. The windows manager 8 would normally generate the end of frame command and pass this directly to the graphics processing unit 36.

As illustrated in FIG. 4, a plurality of rasterizing units 38 are provided in parallel. The rasterizing units 38 are suited to parallel operation as they each have an independent input source comprising a bin store 36 currently being processed and each generate independent output data corresponding to the pixel values for the tile 22 which they are processing. The rasterizing operation thus scales well to parallel operation. Each rasterizing unit 38 contains a tile memory 40 into which new pixel values are written as the drawing commands within the bin store 36 of that tile are processed. At the same time, the rasterizing unit 38 forms dirty pixel data indicating which pixels within the tile memory 40 contain new pixel values (i.e. contain pixel values which need to be updated within the frame buffer memory 30). When the drawing commands within the bin store 36 have been processed, then the rasterizing unit 38 forms a sequence of write commands in dependence upon the dirty pixel data to write only the new pixel values at their locations into the frame buffer memory 30. The pixels within the tile memory 40 for which the dirty pixel data indicates that those pixels are clean pixels (i.e. have not been altered) are not written to the frame buffer memory 30 and accordingly the pixels already stored within the frame buffer memory at those locations remain unaltered. The dirty pixel data thus serves as a write mask for generating write transactions from the tile memory 40 to the frame buffer memory 30 such that these writes are restricted to the pixel values which have been updated by the drawing commands processed from the bin store 36 for the tile 22 concerned.

Figure 5:
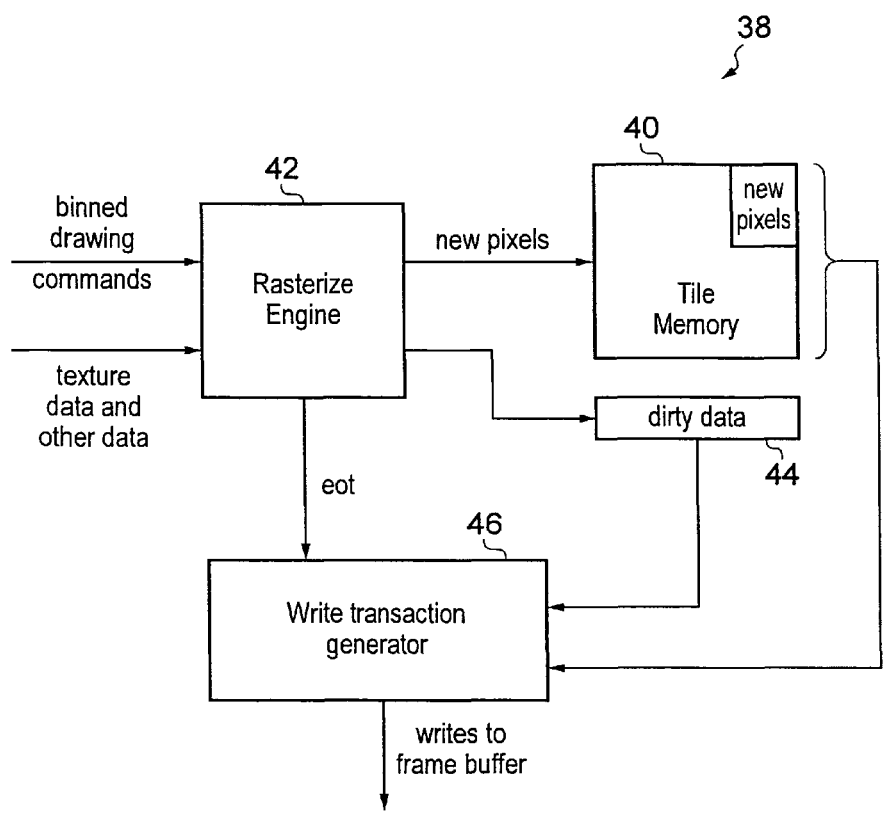
FIG. 5 schematically illustrates a rasterizing portion of a graphics processing unit.

FIG. 5 schematically illustrates a rasterizing unit 38 in more detail. A rasterizing engine 42 receives binned drawing commands from the bin store 36. The rasterize engine 42 also receives texture and other data for forming the new pixel values. It will be appreciated that this texture and other data can take a wide variety of different forms. It may be custom generated for individual tiles by shader programs and/or shader hardware specific to a particular application or use. This form of texture data and other data used in conjunction with drawing commands to generate new pixel values will be familiar to those in this technical field.

The rasterize engine 42 generates its new pixel values and stores these to a tile memory 40. The tile memory 40 can be considered a form of local scratch pad memory used by the rasterizing unit 38 for storage of the new pixel values that have been generated. Each time a new pixel value is written by the rasterize engine 42 into the tile memory 40 a corresponding bit within the dirty pixel data is set. This dirty pixel data is stored within a dirty bit field 44.

When the rasterize engine 42 has processed all of the drawing commands within the bin store 36 for the tile concerned it issues an end of tile (eot) signal to a write transaction generator 46. The write transaction generator 46 is responsive to the dirty pixel data stored within the dirty pixel data field 44 and uses this as a write transaction mask to generate a sequence of writes to the frame buffer memory 30 reading only the new pixel values from the tile memory 40 and writing these to corresponding positions within the frame buffer memory 30. Bits within the dirty pixel data which indicate that the pixels concerned are clean (unaltered) are not subject to a write out to the frame buffer 30.

Figure 6:
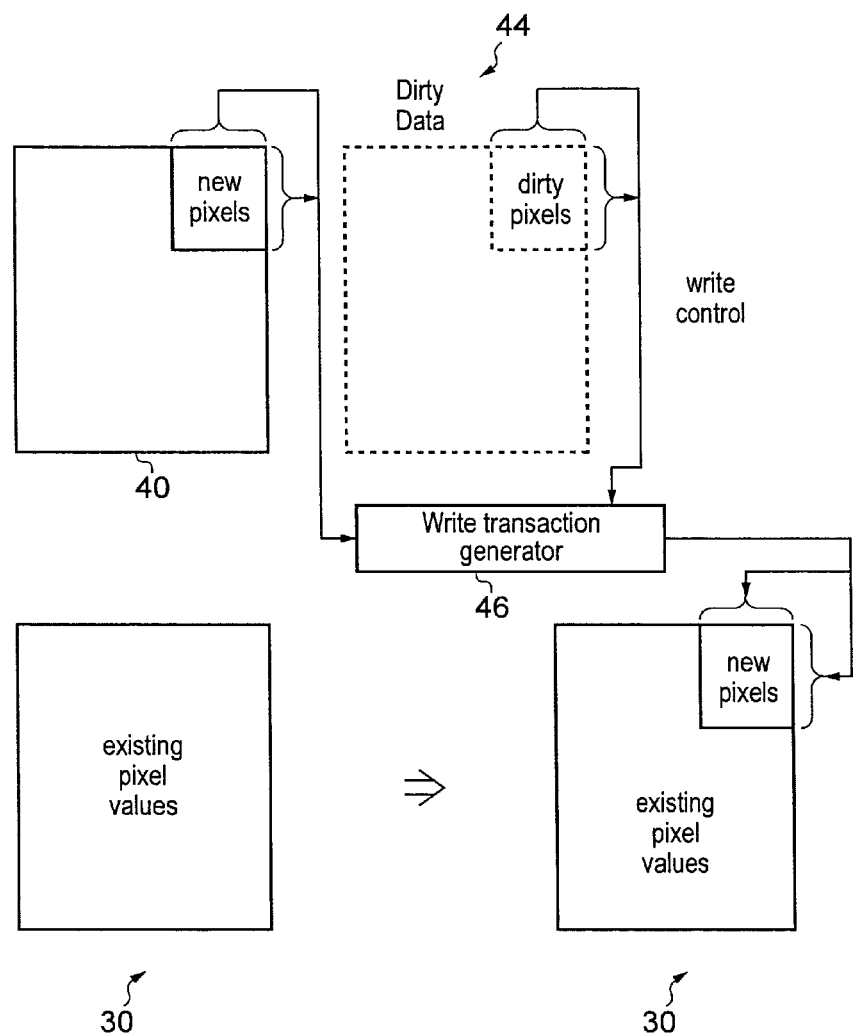
FIG. 6 schematically illustrates using new pixel values and dirty pixel data to generate writes to a frame memory.

FIG. 6 schematically illustrates the writing of new pixel values into the frame buffer memory 30. As shown, the new pixel values within the tile memory 40 are read by the write transaction generator 46 under control of the dirty pixels within the dirty pixel data stored in the dirty data field 44 and are written to a corresponding portion of the frame buffer memory 30. The frame buffer memory 30 already contains existing pixel values from the preceding frame of the windowing display. Those existing pixel values which are unaltered by the drawing commands which have been processed for the tile to generate the current frame of the windowing display are preserved unaltered within the frame buffer memory 30 and only the new pixel values are written into the appropriate locations as shown.

Figure 7:
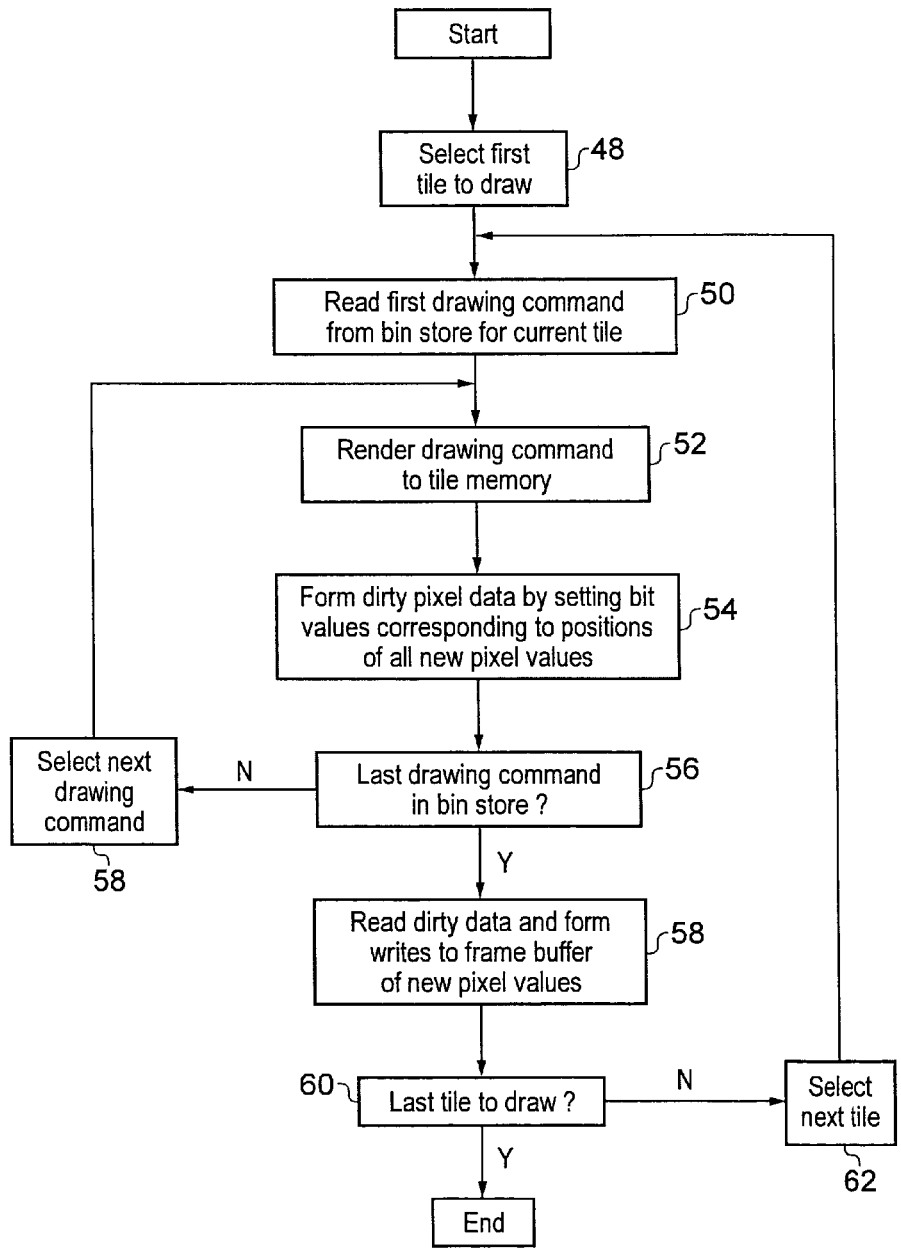
FIG. 7 is a flow diagram schematically illustrating the formation and use of dirty pixel data in controlling writes to a frame memory within a tile-based windows display system.

FIG. 7 is a flow diagram schematically illustrating processing in accordance with the present technique. At step 48 a first tile to be drawn is selected. Step 50 reads the first drawing command from the bin store 36 for the current tile being processed. Step 52 processes the read drawing command and generates new pixel values that are stored within the tile memory 40 of the rasterizing unit 38. Step 54 then forms the dirty pixel data for the drawing command processed at step 52 by setting bit values corresponding to the positions of all the new pixel values written by the processing at step 52 to a value indicating that those positions contain dirty pixel data.

Step 56 determines whether the last drawing command within the bin store 36 for the current tile has been processed.

If further drawing commands remain to be processed for the tile then the next of these is selected at step 58 and processing returns to step 52. If all of the drawing commands for the tile currently being processed have been rendered/rasterized/processed at step 52, then processing proceeds to step 58. Step 58 reads the dirty pixel data and forms writes to the frame buffer memory 30 of the new pixel values stored within the tile memory 40. Step 60 then determines whether the last tile within the new frame of the windowing display has been processed. If there are further tiles to be processed, then the next of these is selected at step 62 and processing returns to step 50. If all the tiles have been processed, then the operations of FIG. 7 are terminated.

Figure 8:
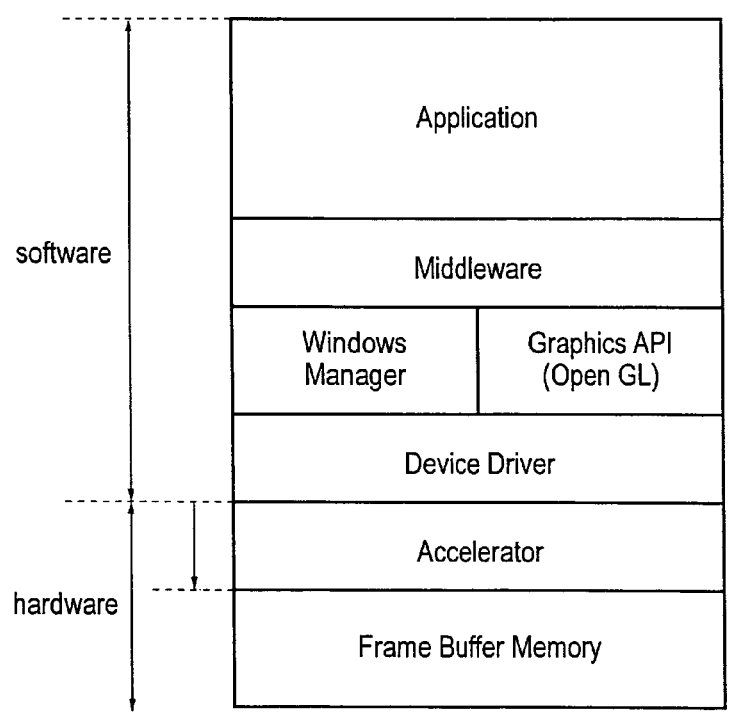
FIG. 8 schematically illustrates different functional layers extending between an application program and a frame buffer memory within a windowing display system.

FIG. 8 schematically illustrates various hardware and software elements involved in forming a windowing display. These elements are illustrated in a hierarchical order as will be familiar to those in this technical field. At one end of this hierarchy the elements are software. At the other end of this hierarchy the elements are hardware. The exact division between the hardware elements and the software elements may vary from implementation to implementation. As an example, the accelerator element shown in FIG. 8 may be provided in hardware or may be provided in software. It could be that a general purpose processor executing hardware may perform all of the processing previously described with the hardware element being restricted to the frame buffer memory into which the frames of the windowing display are written. In other embodiments, a heavier reliance may be placed upon hardware accelerators and hardware elements as these will typically perform faster and more energy efficient graphics processing.

Figure 9:
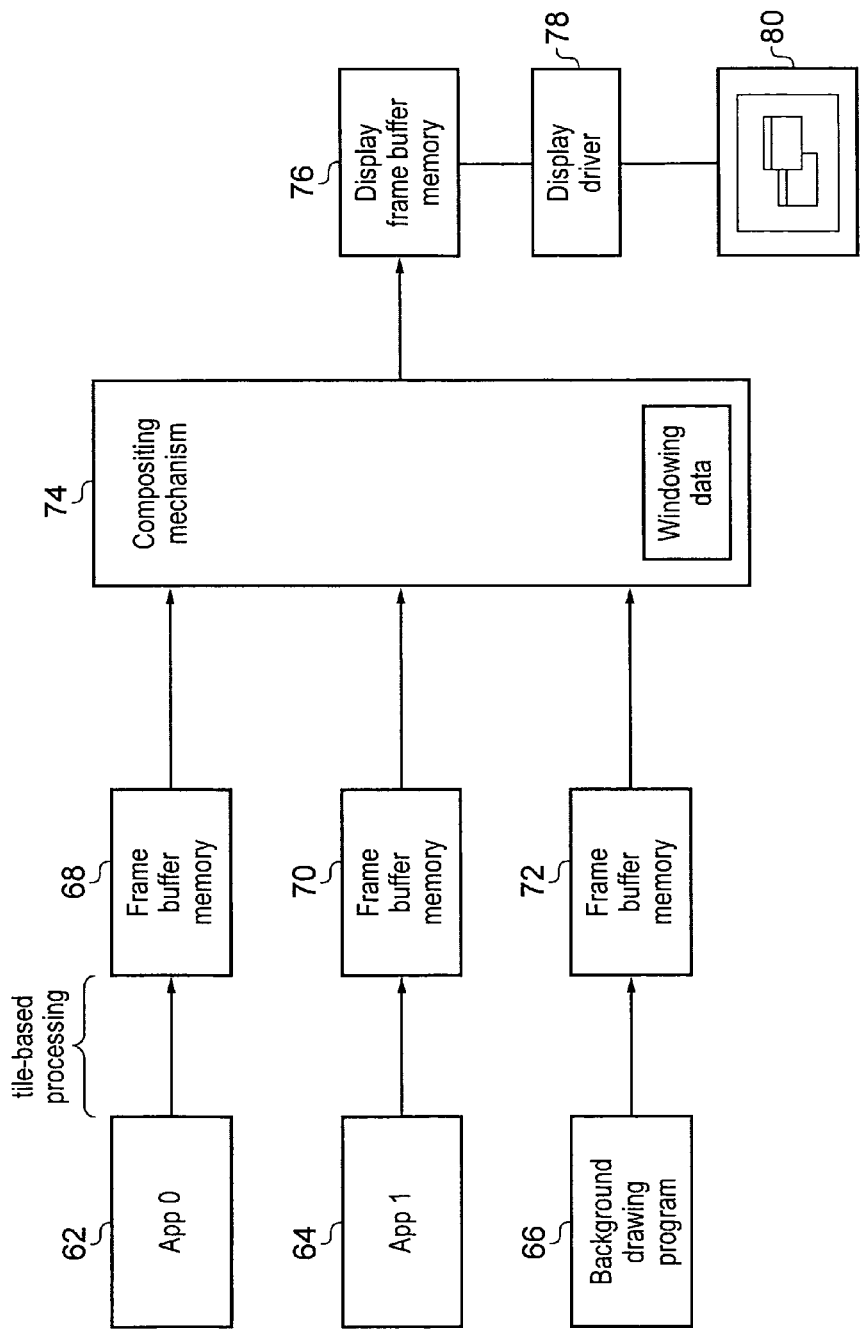
FIG. 9 schematically illustrates the application of the present techniques to a compositing windowing display system.

FIG. 9 schematically illustrates the use of the present techniques in a compositing windowing display system. In this system a first application 62 program issues drawing commands subject to tile-based processing as discussed above before being written used control of dirty pixel data in to a first frame buffer memory 68. A second application 64 similarly writes its pixel value to a second frame buffer memory 70 and a background drawing program 66 writes its pixel values to a third frame buffer memory 72. The tile-based processing techniques discussed above in conjunction with the use of dirty pixel data generated for each tile as it is processed help reduce the number of access operations to the frame buffer memories 68, 70 and 72. This speeds operation and reduces power consumption. Each of the applications 62, 64 and 66 can use the present techniques to advantage in producing their respective frame buffers 68, 70, 72 which are then composited. The individual applications 62, 64, 66 benefit from the use of the dirty data in generating their respective frames more efficiently.

The first, second and third frame buffer memories 68, 70 and 72 are dynamically allocated regions within the general purpose memory of the system. A compositing mechanism 74, which may be hardware or software, serves to combine the pixel data within the frame memories 68, 70 and 72 in dependence upon windowing data defining the current sizes, positions, display ordering, etc of the windows forming the windowing display. The compositing mechanism 74 generates pixel data values for driving a display 80 via a display driver 78 and stores this within a display frame buffer memory 76.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of forming a display, said method comprising the steps of:
    processing one or more drawing commands that write to a tile of a frame buffer memory to form one or more new pixel values to be written to said tile, wherein said frame buffer memory is configured to store pixel values for a plurality of tiles corresponding to said display;
    storing said one or more new pixel values within a tile memory;
    forming dirty pixel data indicative of which pixels within said tile memory are dirty pixels storing said one or more new pixel values and which pixels within said tile memory are clean pixels not storing said one or more new pixel values; and
    in dependence upon said dirty pixel data, writing said one or more new pixel values stored within said dirty pixels of said tile memory to corresponding locations of said frame buffer memory, with pixel values stored within said frame buffer memory corresponding to clean pixels within said tile memory being preserved unaltered,
    wherein said tile is one of a plurality of tiles that together correspond to said display in said frame buffer memory; and
    said steps of processing, storing, forming and writing are separately performed on each one of said plurality of tiles to form a full frame of said display in said frame buffer memory;
    generating one or more drawing commands; and
    storing said one or more drawing commands to form a command store of one or more deferred drawing commands; and
    for each one of said plurality of tiles, reading from said command store one or more deferred drawing commands that write to a tile currently being processed and processing said one or more deferred drawing commands that write to said tile currently being rendered;
    wherein said step of storing said one or more drawing commands comprises binning said one or more drawing commands by identifying which of said one or more drawing commands writes to which of said plurality of tiles and forming a command store comprising a bin store for each of said plurality of tiles, each said bin store storing one or more deferred commands that write to a corresponding tile of said plurality of tiles.

2. A method as claimed in claim 1, wherein said dirty data comprises a bit field with each bit corresponding to a pixel within said tile and having a bit value indicating one of (i) said pixel is one of said dirty pixels; and (ii) said pixel is one of said clean pixels.

3. A method as claimed in claim 1, wherein said dirty data forms a write mask used to control which pixel values are copied from said tile memory to said frame buffer memory.

4. A method as claimed in claim 1, wherein said steps of processing, storing, forming and writing are performed by a tile-based graphics processing unit.

5. A method as claimed in claim 1, wherein the display comprises a windowing display.

6. A method as claimed in claim 5, further comprising the steps of:
    generating windowing control commands with a window manager;
    issuing said windowing control commands to one or more application programs corresponding to one or more windows within said windowing display and a background drawing program configured to draw any background areas of said display;

in response to said windowing control commands, forming said one of more drawing commands with said one of more application programs and said background drawing program.

7. A method as claimed in claim 5, wherein said windowing display is a non-composited windowing display.

8. Apparatus for forming a display in a frame buffer memory, said frame buffer memory is configured to store pixel values for a plurality of tiles corresponding to said display, said apparatus comprising:

processing circuitry responsive to one or more drawing commands that write to a tile of said frame buffer memory to form one or more new pixel values to be written to said tile;

a tile memory configured to store said one or more new pixel values;

dirty pixel data forming circuitry configured to form dirty pixel data indicative of which pixels within said tile memory are dirty pixels storing said one or more new pixel values and which pixels within said tile memory are clean pixels not storing said one or more new pixel values; and write generating circuitry responsive to said dirty pixel data to write said one or more new pixel values stored within said dirty pixels of said tile memory to corresponding locations of said frame buffer memory, with pixel values stored within said frame buffer memory corresponding to clean pixels within said tile memory being preserved unaltered;

wherein said tile is one of a plurality of tiles that together correspond to said display in said frame buffer memory; and said processing circuitry is configured to form said one or more new pixel values, said dirty pixel data forming circuitry is configured to form said dirty pixel data, and said write generating circuitry is configured to write said one or more new pixel values separately for each one of said plurality of tiles to form a frame of said display in said frame buffer memory; and said processing circuitry is configured to:
  generate one or more drawing commands; and
  store said one or more drawing commands to form a command store of one or more deferred drawing commands; and
  for each one of said plurality of tiles, read from said command store one or more deferred drawing commands that write to a tile currently being processed and process said one or more deferred drawing commands that write to said tile currently being rendered;

wherein said processing circuitry is configured to bin said one or more drawing commands by identifying which of said one or more drawing commands writes to which of said plurality of tiles and form a command store comprising a bin store for each of said plurality of tiles, each said bin store storing one or more deferred commands that write to a corresponding tilt of said plurality of tiles.

9. An apparatus as claimed in claim 8, wherein the display comprises a windowing display.

10. Apparatus for forming a display in a frame buffer memory, said memory storing pixel values for a plurality of tiles corresponding to said display, said apparatus comprising:

processing means responsive to one or more drawing commands that write to a tile of a frame buffer memory for forming one or more new pixel values to be written to said tile;

tile memory means for storing said one or more new pixel values;

dirty pixel data forming means for forming dirty pixel data indicative of which pixels within said tile memory are dirty pixels storing said one or more new pixel values and which pixels within said tile memory are clean pixels not storing said one or more new pixel values; and write generating means responsive to said dirty pixel data for writing said one or more new pixel values stored within said dirty pixels of said tile memory to corresponding locations of said frame buffer memory, with pixel values stored within said frame buffer memory corresponding to clean pixels within said tile memory being preserved unaltered;

wherein said tile is one of plurality of tiles that together correspond to said display in said frame buffer memory; and said processing means is configured to form said one or more new pixel values, said dirty pixel data forming means is configured to form said dirty pixel data, and said write generating means is configured to write said one or more new pixel values separately for each one of said plurality of tiles to form a full frame of said display in said frame buffer memory; and said processing means is configured to:
  generate one or more drawing commands; and
  store said one or more drawing commands to form a command store of one or more deferred drawing commands; and
  for each one of said plurality of tiles, read from said command store one or more deferred drawing commands that write to a tile currently being processed and process said one or more deferred drawing commands that write to said tile currently being rendered;

wherein said processing means is configured to bin said one or more drawing commands by identifying which of said one or more drawing commands writes to which of said plurality of tiles and form a command store comprising a bin store for each of said plurality of tiles, each said bin store storing one or more deferred commands that write to a corresponding tile of said plurality of tiles.

11. An apparatus as claimed in claim 10, wherein the display comprises a windowing display.

12. A non-transitory computer program storage medium storing a computer program for controlling an apparatus for processing data to form a display by performing a method comprising the steps of:

processing one or more drawing commands that write to a tile of a frame buffer memory to form one or more new pixel values to be written to said tile, said frame buffer memory configured to store pixel values for a plurality of tiles corresponding to said display; storing said one or more new pixel values within a tile memory; forming dirty pixel data indicative of which pixels within said tile memory are dirty pixels storing said one or more new pixel values and which pixels within said tile memory are clean pixels not storing said one or more new pixel values; and in dependence upon said dirty pixel data, writing said one or more new pixel values stored within said dirty pixels of said tile memory to corresponding locations of said frame buffer memory, with pixel values stored within said frame buffer memory corresponding to clean pixels within said tile memory being preserved unaltered, wherein said tile is one of a plurality of tiles that together correspond to said display in said frame buffer memory; and said steps of processing, storing, forming and writing are separately performed on each one of said plurality of tiles to form a full frame of said display in said frame buffer memory;

generating one or more drawing commands; and storing said one or more drawing commands to form a command store of one or more deferred drawing commands; and for each one of said plurality of tiles, reading from said command store one or more deferred drawing commands that write to a tile currently being processed and processing said one or more deferred drawing commands that write to said tile currently being rendered;

wherein said step of storing said one or more drawing commands comprises binning said one or more drawing commands by identifying which of said one or more drawing commands writes to which of said plurality of tiles and forming a command store comprising a bin store for each of said plurality of tiles, each said bin store storing one or more deferred commands that write to a corresponding tile of said plurality of tiles.

13. A non-transitory computer program storage medium as claimed in claim 12, wherein the display comprises a windowing display.

* * * * *